United States Patent [19]

McDaniel et al.

[11] Patent Number: 5,001,857
[45] Date of Patent: Mar. 26, 1991

[54] ANIMAL TRAP

[76] Inventors: Howard J. McDaniel; Billy McDaniel, both of 21 Donaldson Rd., Loving, N. Mex. 87256

[21] Appl. No.: 394,365

[22] Filed: Aug. 14, 1989

[51] Int. Cl.$^5$ .................... A01M 23/26; A01M 23/24
[52] U.S. Cl. ............................. 43/81; 43/92
[58] Field of Search ............ 43/81, 81.5, 82, 83, 43/92, 70, 72, 95

[56]         References Cited
          U.S. PATENT DOCUMENTS

| | | | |
|---|---|---|---|
| 1,394,649 | 10/1921 | Thompson | 43/81 |
| 1,458,404 | 6/1923 | Goodman . | |
| 1,462,102 | 11/1921 | Dodson . | |
| 1,662,394 | 3/1928 | Mylund | 43/92 |
| 2,146,361 | 2/1939 | Stilson | 43/81 |
| 2,188,297 | 1/1940 | Graybill | 43/81 |
| 2,402,720 | 6/1946 | Azar | 43/81 |
| 4,129,959 | 12/1978 | Souza | 43/92 |
| 4,360,986 | 11/1982 | Dushey | 43/82 |
| 4,472,904 | 9/1984 | Wasielewski | 43/81 |
| 4,574,519 | 3/1986 | Eckebrecht | 43/81 |
| 4,638,590 | 1/1987 | Desrosiers | 43/81 |
| 4,711,049 | 12/1987 | Kness | 43/81 |

OTHER PUBLICATIONS

Advertisement for pesticide (d-CON ®) showing standard mouse trap.

*Primary Examiner*—Kurt Rowan
*Attorney, Agent, or Firm*—Deborah A. Peacock; Donovan F. Duggan; William A. Eklund

[57]         ABSTRACT

A bail-type animal trap for small rodents and the like, having a self-setting triggering mechanism. The trap includes a spring-loaded, bail-type striker which is hinged to the upper surface of the base. The striker is releasably retained in the cocked position by a resilient latch which is connected by a wire or rod to a trigger plate which is adapted to hold a piece of bait. The trigger plate engages a stop affixed to the base. The trigger plate includes an integral catch for engaging the stop, and an integral fulcrum which causes the trigger to release when it is either lifted, depressed, or moved sideways. The striker further includes a self-setter which returns the trigger plate to the set position each time the trap is sprung.

20 Claims, 4 Drawing Sheets

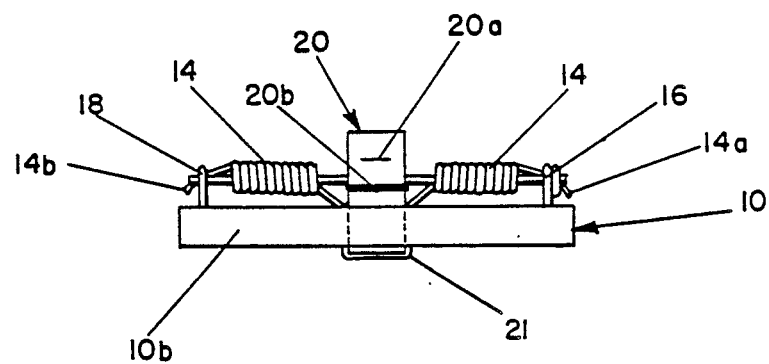
FIG—6
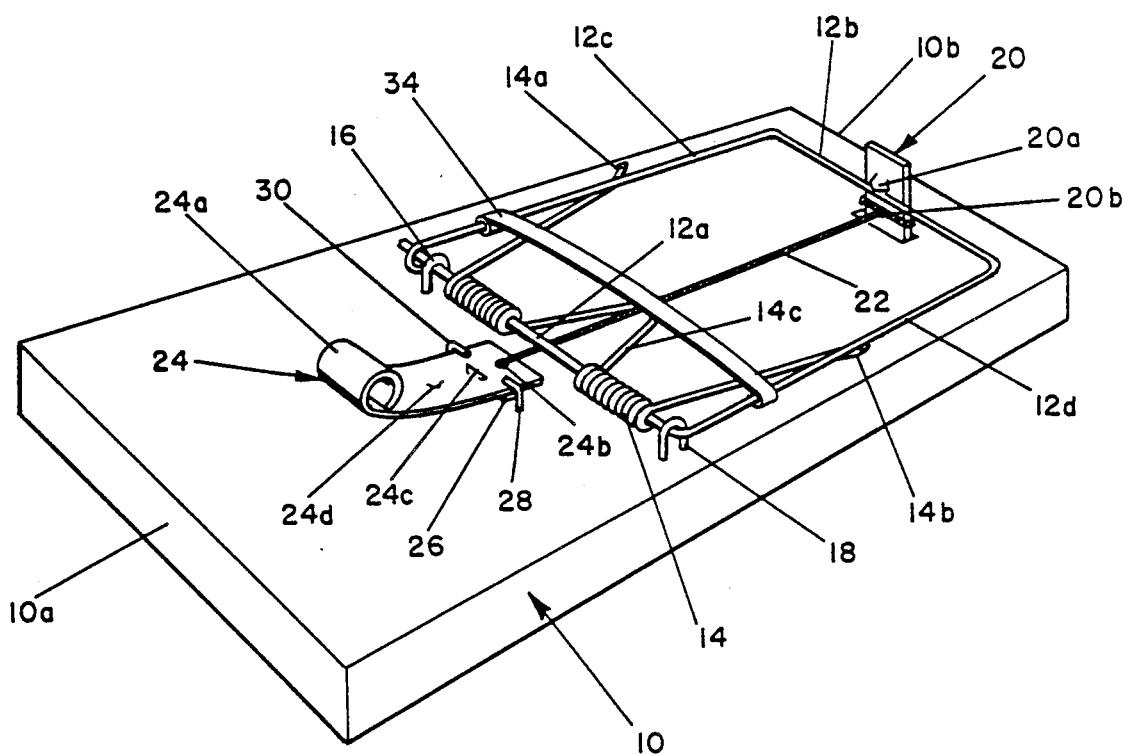
FIG—7

ANIMAL TRAP

BACKGROUND OF THE INVENTION

1. Field of the Invention

The invention described and claimed herein is generally related to traps for catching small animals, such as mice or other small rodents. More particularly, the present invention is related to those animal traps having a spring-loaded, bail-type striker which is cocked upon being set, and which upon release by a triggering mechanism strikes and typically kills the animals.

2. Description of Related Art

Many animal traps having a bail-type striker are typically set by a two step process, involving first cocking and latching the bail-type striker, followed by the setting of a baited triggering mechanism. This process is typically awkward and difficult for several reasons. One reason is that the triggering mechanism must be set while the trap is held cocked, a process that is awkward in and of itself even with two hands. Typically the trap must be held cocked with one hand while the other hand sets the triggering mechanism, with the latter step being somewhat difficult to perform with only one available hand.

Another disadvantage common to many of the previously available traps is that the trigger mechanism of the trap must be manually set while the bail-type striker is held cocked, but not latched, and with the fingers in the path of the striker. This occurs because the triggering mechanism typically lies with the path of the striker. The setting process is thus at the very least awkward, and not infrequently leads to the trap being sprung on the fingers while it is being set, causing pain and even injury to the fingers.

Yet another disadvantage of many previously available traps is that the trigger mechanism is not sufficiently sensitive to be entirely reliable. Some trigger mechanisms are actuated only when an animal pulls or pushes a piece of bait in a particular direction, but is not actuated when the animal pushes or pulls the bail in all directions. Consequently, it is possible under some circumstances for an animal to remove the bail without triggering the trap.

U.S. Pat. No. 4,360,986 to Dushey, discloses a bail-type animal type which is intended to allow setting without exposing the fingers to the bail. However, the trap disclosed in Dushey suffers from the common disadvantage noted above of being triggered only by the bait being depressed downwardly, and is not triggered when the bait is pushed or pulled in other directions.

U.S. Pat. No. 4,711,049, to Kness, discloses an animal trap which is also intended to allow setting without exposing the fingers to the bail. The trap disclosed in Kness also suffers however from the disadvantage noted above of only being riggered by downward depression of the bait.

U.S. Pat. No. 4,574,519, to Eckerbrecht, discloses a mouse trap having a novel combined trip bar and holding member, for preventing injury to the fingers during setting of the trap.

U.S. Pat. No. 1,458,404, to Goodman, discloses a rat trap which is also designed to avoid injury to the finer upon setting the trap.

U.S. Pat. No. 1,462,102, to Dodson, discloses a trap having a trigger mechanism that is located primarily on the underside of the traps, but which is actuated only by downward pressure on a bait holder.

SUMMARY OF THE INVENTION

The present invention provides an improved animal trap which is automatically self-setting and easily actuated. The preferred animal trap of the invention comprises a generally flat base comprising a forward end and a rear end; a bail-type striker hinged to the base for relative swinging motion on the base between a cocked position at the rear end of the base and a sprung position at the forward end of the base; spring means for driving the striker from the cocked position at the rear end of the base to the sprung position at the forward end of the base; resilient latch means affixed to the rear end of the base and extending upwardly therefrom, the latch comprising means operable to engage and retain the striker in the cocked position, and the latch means being resiliently disposed toward the rear end of the base so as to release the striker except when urged toward the forward end of the base; a trigger plate comprising an integral downwardly protruding catch and integral fulcrum means, the trigger plate further comprising means for retaining a piece of bait placed thereon; connecting means connecting the latch means to the trigger plate; and stop means affixed to the base, the stop means being engageable with the catch of the trigger plate, and the trigger plate, when engaged with the stop means, operating through the connecting means to urge the latch means toward a forward position retaining the striker in the cocked position. The trigger plate may be disengaged from the stop means upon the trigger plate being depress downwardly, being lifted upwardly or being moved sideways, by an animal, so as to thereby release the latch means and allow the striker to be driven to the sprung position. In the preferred animal trap of the invention, the bail-type striker comprises a heavy gauge wire formed into a generally rectangular configuration having four integral segments, one of the segments being an axial segment about which the striker rotates.

The animal trap further comprises a self-setter. The preferred self-setter comprises an elongate plate extending transversely from the axial segment of the striker and oriented so as to urge the trigger plate into engagement with the stop means upon the striker rotating from the cocked position to the sprung position. In an alternative embodiment, the self-setter comprises a resilient cross-bar affixed to and extending across the striker, wherein the cross-bar is oriented so as to urge the trigger plate into engagement with the stop means upon the striker rotating from the cocked position to the spring position.

In the preferred embodiment, the connecting means may comprise a wire or rod extending between the trigger plate and the latch means. The latch means preferably comprises a resilient plate extending upwardly from the base, the resilient plate comprising an integral catch extending forwardly from the plate. The stop means preferably comprises a staple fully driven into the base so as to form a rigid stop positioned close to the surface of the base. The integral fulcrum means of the trigger plate may comprise an integral dent punched into the trigger plate from its upper surface or a downwardly extending curve in the trigger plate. The integral downwardly extending catch of the trigger plate preferably comprises a downwardly punched section of the plate, the downwardly punched section being formed by first forming a punched transverse slit in the trigger plate, followed by punching downwardly a segment of the plate immediately forward of the slit. The catch means extending forwardly of the resilient plate of the latch means preferably comprises a forwardly punched segment of the resilient plate, the forwardly punched segment being formed by first forming a transverse slit in the resilient plate, followed by punching forward a segment of the resilient plate above the slit from the rear side of the resilient plate.

Accordingly, and in view of the foregoing, it is an object and purpose of the present invention to provide an improved animal trap which can be set without significant risk of the trap being sprung on the fingers while being set.

It is another object and purpose of the present invention to provide an animal trap which is automatically self-setting when the trap is cocked.

It is yet another object of the present invention to provide an animal trap which is characterized by a trigger mechanism that is actuated regardless of the direction in which a piece of bait is pushed or pulled by an animal.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

These and other aspects of the present invention will be more apparent upon consideration of the accompanying drawings and the detailed description set forth below.

BRIEF DESCRIPTION OF THE DRAWINGS

The accompanying drawings form a part of and are incorporated by reference into this specification. The drawings, when taken with detailed description of the invention set forth below, serve to illustrate certain preferred embodiments of the invention and the best mode contemplated by the inventor of making the present invention.

In the drawings:

FIG. 6 is an end view of the trap in the uncocked, or sprung, position;

FIG. 7 is an isometric view of an alternative preferred embodiment of the present invention;

DESCRIPTION OF THE PREFERRED EMBODIMENT

Figure 1:
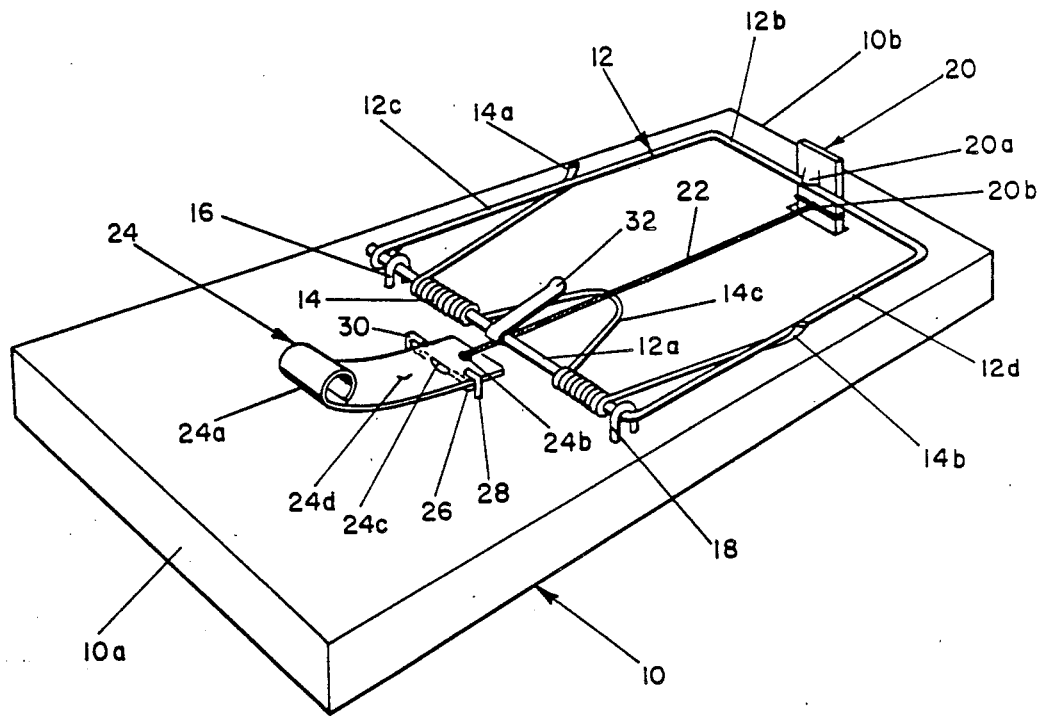
FIG. 1 is an isometric view of the animal trap of the present invention in the cocked, or set, position.

Referring to FIGS. 1 through 6, the preferred embodiment on the animal trap of the present invention comprises a substantially solid rectangular base 10. Mounted on the upper side of the base 10 is a spring-loaded bail-type striker 12. The striker 12 consists of a length of heavy gauge material, such as steel wire, which is bent into a generally rectangular configuration having four straight segments 12a through 12d, with one end of the length of wire preferably looped about the opposite end to complete the rectangular configuration. The striker 12 comprises a straight axial segment 12a about which the striker 12 rotates in, swinging from a cocked position to a sprung position. The straight axial segment 12a is encircled by a coil spring 14 which drives the striker 12 and urges it toward the uncocked, or sprung, position, illustrated in FIGS. 2 and 4. The coil spring 14 and the straight axial segment 12a are maintained in a fixed position extending across the center of the base 10 by means of a pair of heavy hinge staples 16 and 18, preferably u-shaped staples, which extend over the straight segment 12a at opposite ends of the spring 14, and which are affixed in the base 10 and function as journal bearings for the axial segment 12a. The spring 14 comprises opposite end arms 14a and 14b which extend generally transversely to the axis of the spring and which engage the opposite side segments 12c and 12d of the striker 12. The coil spring 14 further comprises an integral central portion 14c which extends outwardly and downwardly, and which is urged against the base 10 so as to maintain a suitable level of tension in the spring 14. In operation, it is the outer segment 12b of the striker 12 which strikes and kills an animal upon the trap being sprung.

Figure 2:
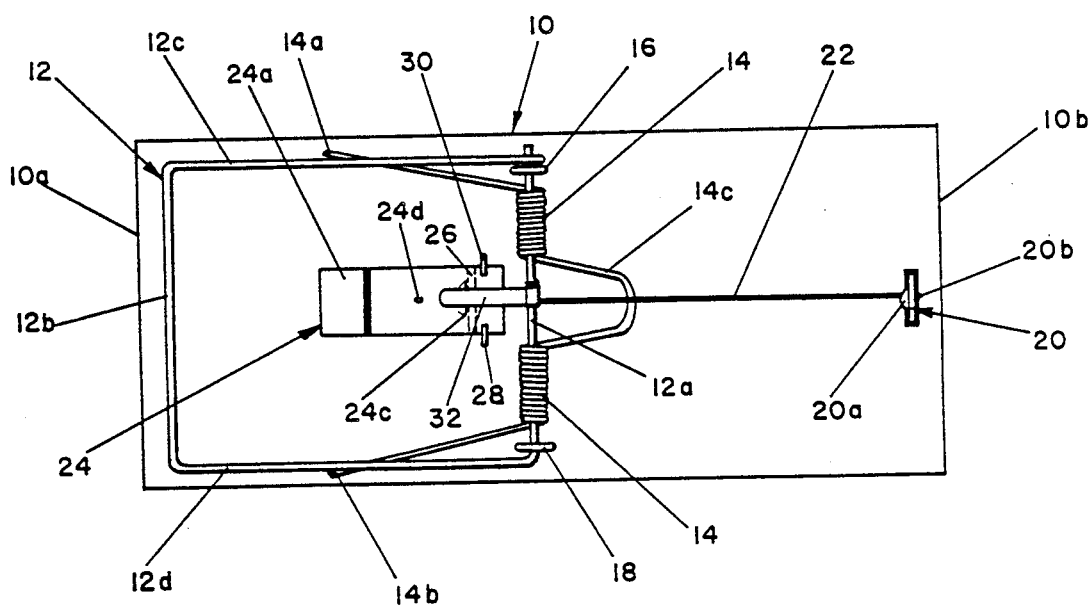
FIG. 2 is a plan view of the animal trap of FIG. 1 in the sprung, or unset, position.
Figure 4:
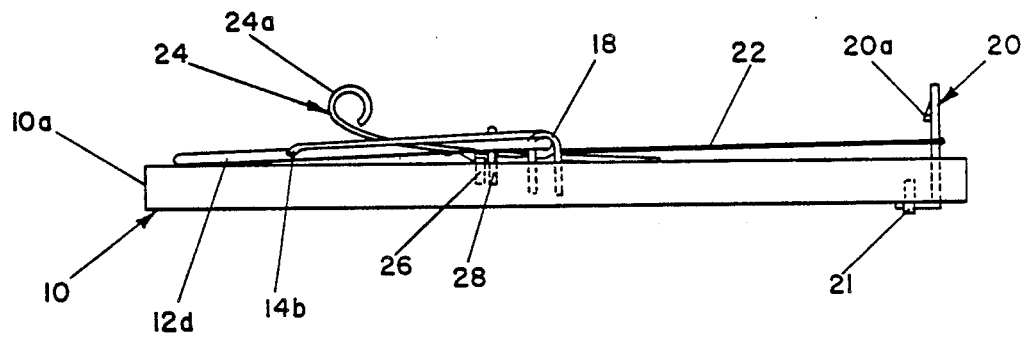
FIG. 4 is a side view of the animal trap of FIG. 1 in the sprung position.

For the purposes of the description, the end of the trap at which the outer end 12b of the striker 12 rests while in the uncocked position, shown in FIGS. 2, 4 and 7, will be referred to as the forward end 10a of the trap, and the opposite end will be referred to as the rear end 10b of the trap. This orientation will also be used with reference to various elements of the trap.

Figure 3:
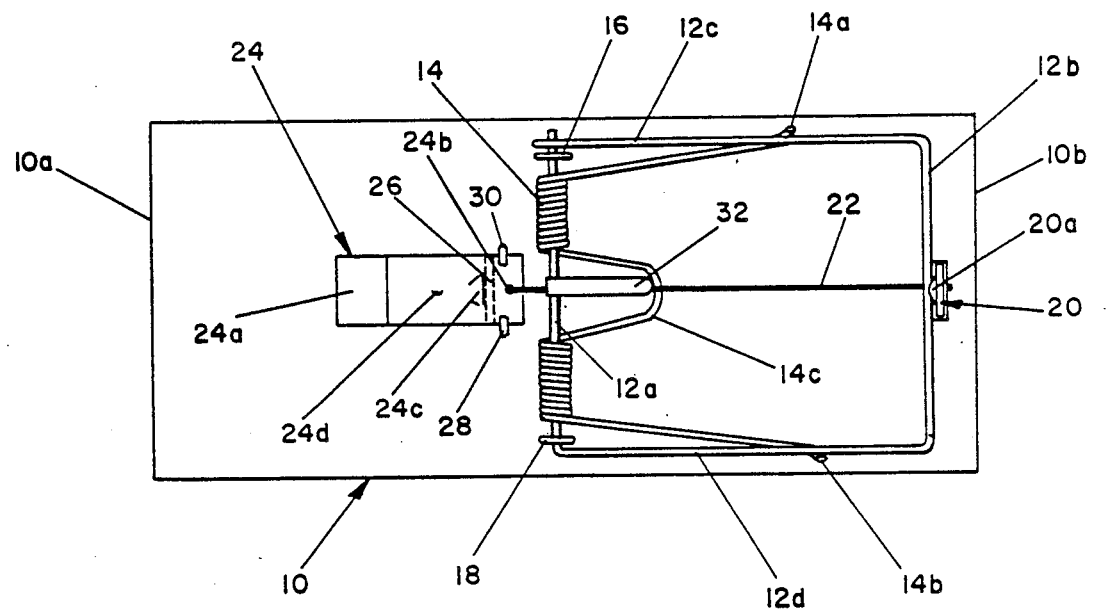
FIG. 3 is a plan view of the animal trap of FIG. 1 in the cocked, or set, position.
Figure 5:
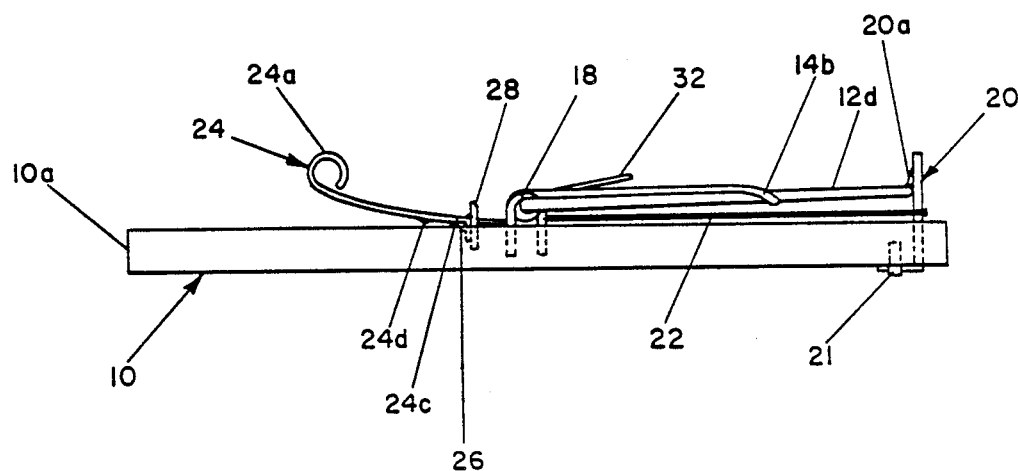
FIG. 5 is a side view of the animal trap of FIG. 1 in the cocked, or set, position.

The striker 12 is retained in the cocked position, as shown in FIGS. 1, 3 and 5, by means of a latch 20. The latch 20 consists of a planar strip, such as a steel strip, that extends upwardly through a slot in the base 10. The lower end of the latch 20 is folded under the underside of the base 10 and is stapled thereto by a staple 21, as shown in FIGS. 4, 5, and 6, so as to prevent the latch 20 from being pulled upwardly from the base 10. The latch 20 extends upright from the slot and comprises an integral striker catch 20a which is formed by means of a protruding, punched notch. More specifically, the catch 20a is made by first forming a transverse slit in the latch 20, followed by punching forward a segment of the latch strip just above the slit, so as to form the protruding catch 20a having a downwardly facing angular edge. When the striker 12 is positioned in the cocked position, shown for example in FIG. 1, the catch 20a of the latch 20 may be extended over the outer segment 12b of the striker 12 so as to retain the striker 12 in the cocked position.

The latch 20 further comprises a hole 20b, located below the catch 20a, which receives a first end of a trigger wire 22. The trigger wire 22 extends through hole 20b in the latch 20 and is wrapped around the latch 20 to firmly secure the first end of the trigger wire 22 to the latch 20. In an alternative embodiment, not shown, the "wire" may be a rod, such as a steel rod, which engages with a slot in the latch 20. Such an embodiment is useful for large rodents, such as rats. The invention is not limited to the particular trigger mechanism shown in the drawings.

Figure 8:
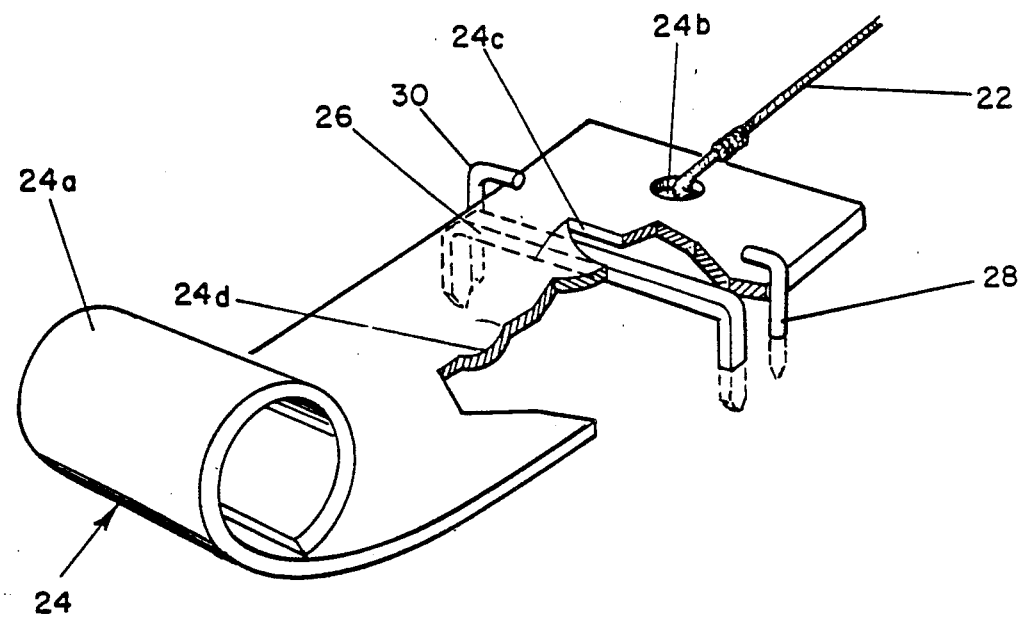
FIG. 8 is a partially cut-away isometric view of the trigger plate of the trap.
Figure 9:
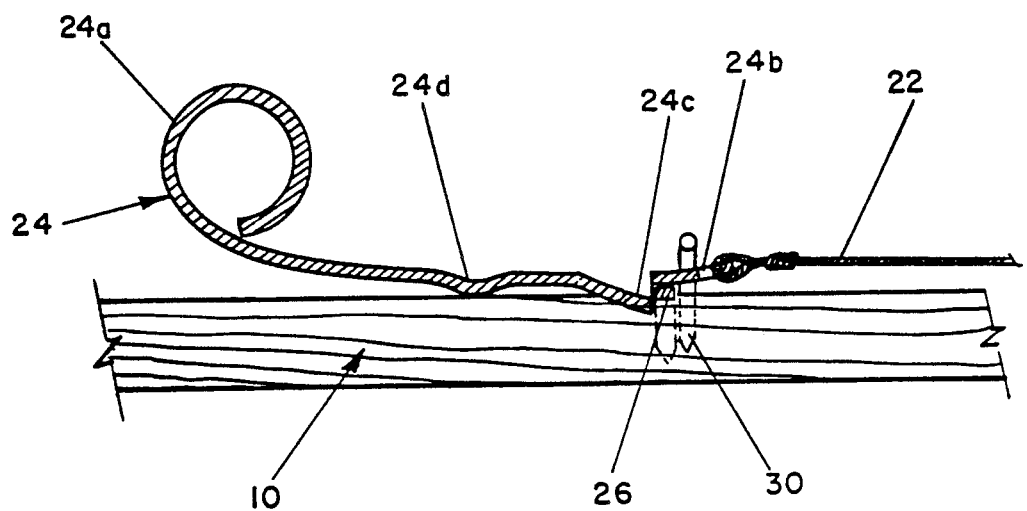
FIG. 9 is a side view in cross-section of the trigger plate.

The opposite or forward end of the trigger wire 22 is affixed to the rear end of a trigger plate 24, which is shown more particularly in FIGs. 8 and 9. The trigger plate 24 functions in a dual capacity as a bait holder and as a trigger which actuates the trap. The trigger plate 24 preferably comprises a rigid accurate strip, folded upwardly and backward at its forward end 24a to assist in holding bait, although other end shaped are useful in accordance with the invention. At the rear end of the plate 24 is a hole 24b by which the trigger wire 22 is affixed to the plate 24. The plate 24 also comprises an integral trigger catch 24c, which is formed as a downwardly punched protrusion, and which is formed in essentially the same manner as the catch 20a of latch 20. More specifically, the catch 24c is formed by first forming a transverse slit in the plate 24, followed by punching the plate 24 downwardly on the forward side of the slit, so as to form the downwardly protruding catch 24c having a rearwardly facing edge. The trigger plate 24 also preferably comprises a downwardly protruding dent 24d, which is located forward of the catch 24c. The function of the dent 24d is as described below. The trigger plate 24 is preferably curved concavely upwardly, for the reasons discussed below.

The latch 20 is made sufficiently resilient such that when striker 20 is in the cocked position and therefore retained by the latch 20, the tension in the trigger wire 22 or rod is maintained by the resiliency of the catch 20. Latch 20 is resiliently disposed toward rear end 10b of base 10 so as to release striker 12, except when urged toward forward end 10a of base 10.

The catch 24c of the trigger plate 24 engages a staple 26, preferably a round staple, which is driven completely into the base 10 until the top of the staple 26 thus forms a rigid stop, against which the catch 24d of the trigger plate engages to hold the striker 12 in the cocked position. Stop 26 is thus affixed to base 10 and engageable with catch 24 c of trigger plate 24. Trigger plate 24, when engaged with stop 26, operates through connecting means or trigger wire 22 to urge latch 20 toward a forward position, retaining striker 12 in the cocked position.

The downwardly protruding dent 24d in the trigger plate 24 function as a lever and integral fulcrum, to cause the catch 24c of the trigger plate 24 to be lifted upwardly and free of the staple 26 when the forward end 24a of the plate 24 is pressed downwardly by an animal. Although the dent 24d is preferably, a trigger plate 24 curved downwardly in this area will also function as a lever and integral fulcrum. The trigger plate 24 is preferably curved concavely upwardly so as to enable it to pivot about the end 24c. It will be noted that the catch 24c will also release from the staple 26 when the forward end 24a of the trigger plate 24 is lifted upwardly by an animal. Thus it will be apparent that one of the primary advantages of this aspect of the invention is that the trigger plate 24 will be released from engagement with the staple 26 either when the folded end 24a of the plate 24, bearing the bait, is lifted upwardly, depressed downwardly, or moved sideways. This results in increased sensitivity over similar animal traps previously available.

The trigger plate 24 is preferably bent slightly upwardly at its rear end, between the trigger wire hole 24b and the catch 24c, so that when the trigger wire 22 pulls on the trigger plate 24, the plate tends to pivot upwardly and more readily release from the stop 26.

A pair of small hooked pegs 28 and 30, each preferably having a curved upper end, is embedded in the base 10 on opposite sides of the trigger plate 24, just rearward of the staple 26. The curved upper ends of the pegs 28 and 30 are oriented so as to extend over the trigger plate 24 and retain the plate 24 in the general vicinity of the staple 26. The pegs 28 and 30 do not firmly engage the trigger plate 24, but rather simply limit the range of lateral and upward motion of the trigger plate, with the trigger wire 22 operating to keep the trigger plate from moving forward, and the staple 26 and folded end 24a of the trigger plate operating to retain the plate 24 from moving too far rearward.

The trap further comprises a self-setter 32, which in the preferred embodiment comprises a narrow elongate plate which extends forwardly and downwardly from the axial segment 12a of the striker 12 when the striker 12 is in the sprung position shown in FIG. 1. In the sprung position shown in FIG. 2, the self-setter 32 bears gently upon the trigger plate 24 so as to urge the trigger plate 24 into engagement with the staple 26. Thus the trap is generally set automatically by the self-setter 32 each time the trap is sprung. It will be noted that the self-setter 32 is short and is oriented at an angle with respect to the striker 12, such that the self-setter 32 does not significantly diminish the strength of the spring 14 in driving the striker 12.

FIG. 7 illustrates an alternative preferred embodiment for the self-setter. In FIG. 7, elements which are substantially identical to elements shown in FIGS. 1 through 6 are like-numbered. In the embodiment shown in FIG. 7, the alternative self-setter comprises a resilient, downwardly concave cross-bar setter 34, preferably made of metal. The cross-bar setter 34 is affixed to the side segments 12c and 12d of the striker 12. The cross-bar setter 34 urges the trigger plate 24 downwardly and forwardly when the stop is in the uncooked, or sprung, position, so as to set the trigger plate 24.

It will be appreciated that the present invention has been described above with reference to a preferred embodiment and an alternative preferred embodiment. However it will also be apparent that various modifications, substitutions and alterations, which may be apparent to one of ordinary skill in the art, may be made without departing from the essential invention.

We claim:
1. An animal trap comprising:
a generally flat base comprising a forward end and a rear end;
a bail-type striker hinged to said base for relative swinging motion on said base between a cocked position at said rear end of said base and a sprung position at said forward end of said base;
spring means for driving said striker from said cocked position at said rear end of said base to said sprung position at said forward end of said base;
resilient latch means affixed to said rear end of said base and extending upwardly therefrom, said latch comprising means operable to engage and retain said striker in said cocked position, said latch means being resiliently disposed toward said rear end of said base so as to release said striker except when urged toward said forward end of said base;

a trigger plate comprising an integral downwardly protruding catch and integral fulcrum means, said trigger plate further comprising means for retaining a piece of bait placed thereon;
connecting means said latch means to said trigger plate; and
stop means affixed to said base, said stop means being engagable with said catch of said trigger plate, and said trigger plate, when engaged with said stop means, operating through said connecting means to urge said latch means toward a forward position retaining said striker in said cocked position;
whereby said trigger plate may be disengaged from said stop means upon said trigger plate being depressed downwardly, being lifted upwardly or being moved sideways, by an animal, so as to thereby release said latch means and allow said striker to be driven to said sprung position.

2. The animal trap defined in claim 1 wherein said bail-type striker comprises a heavy gauge wire formed in a generally rectangular configuration having four integral segments, one of said segments being an axial segment about which said striker rotates.

3. The animal trap defined in claim 1 further comprising a self-setter, said self-setter comprising an elongate plate extending transversely from said axial segment of said striker and wherein said self-setter is oriented so as to urge said trigger plate into engagement with said stop means upon said striker rotating from said cocked position to said sprung position.

4. The animal trap defined in claim 1 wherein said connecting means comprises a wire extending between said trigger plate and said latch means.

5. The animal trap defined in claim 1 wherein said connecting means comprises a rod extending between said trigger plate and said latch means.

6. The animal trap defined in claim 1 wherein said latch means comprises a resilient plate extending upwardly from said base, said resilient plate comprising an integral catch extending forwardly from said plate.

7. The animal trap defined in claim 1 wherein said stop means comprises a staple fully driven into said base so as to form a rigid stop positioned close to the surface of said base.

8. The animal trap defined in claim 1 wherein said integral fulcrum means of said trigger plate comprises an integral dent punched into said trigger plate from its upper surface.

9. The animal trap defined in claim 1 wherein said integral fulcrum means of said trigger plate comprises a downwardly extending curve in said trigger plate.

10. The animal trap defined in claim 1 wherein said integral downwardly extending catch of said trigger plate comprises a downwardly punched section of said plate, said downwardly punched section being formed by first forming a punched transverse slit in said trigger plate, followed by punching downwardly a segment of said plate immediately forward of said slit.

11. The animal trap defined in claim 1 wherein said catch means extending forwardly of said resilient plate of said latch means comprises a forwardly punched segment of said resilient plate, said forwardly punched segment being formed by first forming a transverse slit in said resilient plate, followed by punching forward a segment of said resilient plate above said slit from the rear side of said resilient plate.

12. The animal trap defined in claim 1 wherein said bail-type striker comprises a heavy gauge wire formed into a generally rectangular configuration having four integral segments, one of said segments being an axial segment about which said striker rotates, and wherein said trap further comprises a self-setter, said self-setter comprising a resilient cross-bar affixed to and extending across said striker, and wherein said cross-bar is oriented so as to urge said trigger plate into engagement with said stop means upon said striker rotating from said cocked position to said sprung position.

13. The animal trap defined in claim 12 wherein said connecting means comprises a wire extending between said trigger plate and said latch means.

14. The animal trap defined in claim 12 wherein said connecting means comprises a rod extending between said trigger plate and said latch means.

15. The animal trap defined in claim 12 wherein said latch means comprises a resilient plate extending upwardly from said base, said resilient plate comprising an integral catch extending forwardly from said plate.

16. The animal trap defined in claim 12 wherein said stop means comprises a staple fully driven into said base so as to form a rigid stop positioned close to the surface of said base.

17. The animal trap defined in claim 12 wherein said integral fulcrum means of said trigger plate comprises an integral dent punched into said trigger plate from its upper surface.

18. The animal trap defined in claim 12 wherein said integral fulcrum means of said trigger plate comprises a downwardly extending curve in said trigger plate.

19. The animal trap defined in claim 12 wherein said integral downwardly extending catch of said trigger plate comprises a downwardly punched section of said plate, said downwardly punched section being formed by first forming a punched transverse slit in said trigger plate, followed by punching downwardly a segment of said plate immediately forward of said slit.

20. The animal trap defined in claim 12 wherein said catch means extending forwardly of said resilient plate of said latch means comprises a forwardly punched segment of said resilient plate, said forwardly punched segment of said resilient plate, said forwardly punched segment being formed by first forming a transverse slit in said resilient plate, followed by punching forward a segment of said resilient plate above said slit from the rear side of said resilient plate.

* * * * *